Jan. 4, 1966

B. W. SZUGDA 3,226,771

MOLD DIE

Filed Jan. 31, 1963

INVENTOR.
Bernard W. Szugda
BY
Attorney

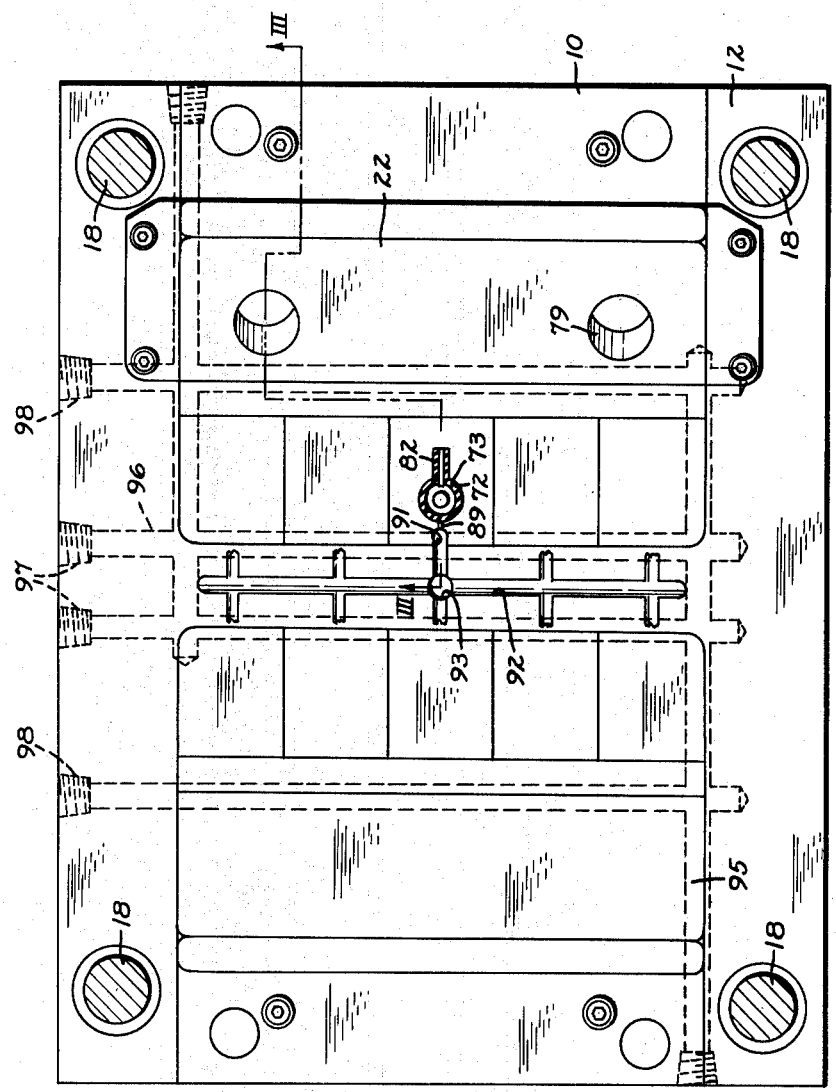

United States Patent Office

3,226,771
Patented Jan. 4, 1966

3,226,771
MOLD DIE
Bernard W. Szugda, Southbridge, Mass., assignor to Bermer Tool & Die, Inc., Southbridge, Mass., a corporation of Massachusetts
Filed Jan. 31, 1963, Ser. No. 255,271
2 Claims. (Cl. 18—42)

This invention relates to a die and, more particularly, to apparatus arranged to produce plastic articles by the injection molding method.

In injection molding, it is common practice to provide a die which is made in two parts with one part of the mold cavity in one portion and another part of the mold cavity in the other portion. When these two portions are brought together, the mold cavity is completed and molten plastic is injected into the cavity. The portions are then separated and the formed plastic article is removed. The parting line or division plane between the two parts of the die is selected so that the molded article may be readily withdrawn from each portion, after it has been completed. In many cases, however, the plastic article must be formed with recesses which extend into the article parallel to the parting plane; this makes it impossible to "draw" the article after it has been molded if only a simple mold is provided. In order to take care of this more complex situation, a so-called "side-action" die is used in which a core member is introduced into the mold cavity to provide for such recesses. This core member is withdrawn when the die portions are separated and the plastic article may then be removed. Furthermore, it is common practice to provide an ejector mechanism for pushing the plastic article out of the mold cavity after the two portions of the die have been separated. In many cases, this ejection mechanism moves into a portion of the mold cavity which, during molding, is occupied by the core member; it is, therefore, extremely important that the core member be removed or absent from that part of the mold cavity when the ejector pin enters; otherwise, considerable damage will be done to the die parts and this will require expensive repairs. Although the conventional injection molding machine contains a double-acting cylinder for moving the die portions together and apart, considerable difficulty has been experienced in making sure that the ejector pin is removed from the mold cavity before the core member is introduced by the side-action mechanism. Attempts have been made to use springs to cause the ejector mechanism to move out of the core cavity, but the limitations of space prevent the use of adequate spring power; furthermore, a spring suffers from the difficulty that its force decreases linearly as it expands. In addition, a common difficulty experienced with springs is that they may break after many operative cycles of the ejection mold and, when this happens, there is interference between the ejector pin and the core member with resulting damage to the die. Not only is repair of the die expensive but the injection molding machine is out of operation and production of the particular plastic article is suspended while the die is being repaired. Attempts to perform this function by use of hydraulic cylinders have been discouraging because the initial cost of such equipment is quite high and the valving and the hoses which are necessary constitute a very complicated mechanism. These and other difficulties experienced with the prior art devices have been obviated in a novel manner by the present invention.

It is, therefore, an outstanding object of the present invention to provide a die in which means is provided for positively assuring that there is no interference between sideaction mechanism operation and the operation of ejector mechanisms.

Another object of this invention is the provision of a die for use in the injection molding of a plastic article in which an inexpensive means is provided for assuring that the die is not damaged by engagement between an ejector pin and a side-action core member.

A further object of the present invention is the provision of an injection molding die in which the ejector plate is connected to the separable portions of the die in such a way that the ejector plate is moved away from the mold cavity when the two portions of the die are brought together.

Another object of the instant invention is to provide a separable die having a side-action mechanism and an ejector mechanism wherein a safety means is provided to assure no interference between the two mechanisms.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 4 is a horizontal sectional view of the invention taken on the line IV—IV of FIG. 3.

Figure 1:
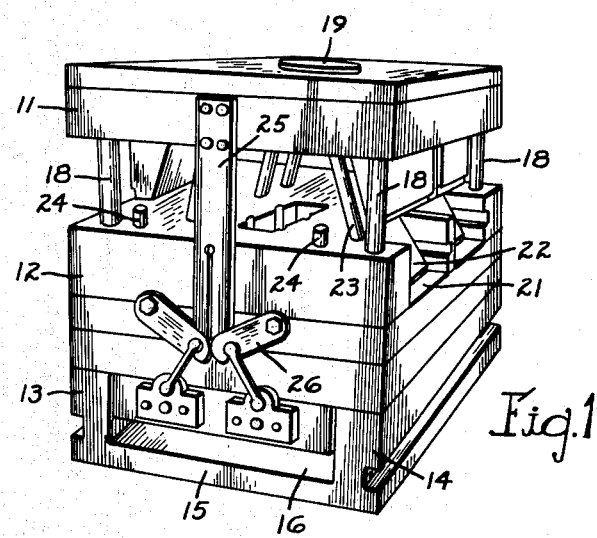
FIG. 1 is a perspective view of a die embodying the principles of the present invention.

Referring first to FIG. 1, wherein are best shown the general features of the invention, the die, indicated generally by the reference numeral 10, is shown as comprising an upper portion 11 and a lower portion 12. The lower portion 12 is bolted to the top surfaces of upstanding side flanges 13 and 14 of a base 15 which is adapted to be mounted, in turn, on the table of an injection molding machine (not shown). The side flanges 13 and 14 defines a rectilinear recess 16 in which resides an ejector plate 17. Extending vertically from the lower portion 12 are guide posts 18 on which the upper portion 11 is slidably supported. Entering the top of the upper portion 11 is an injection port 19 which is adapted to mate with the nozzle of the injection molding machine.

Formed on either side of the lower portion 12 are recesses 21 in which are slidably mounted side-action mechanisms 22. Extending downwardly from the lower surface of the upper portion 11 is a slanted peg 23 which engages the side-action mechanism to move it inwardly and outwardly. Extending upwardly from the lower portion 12 are guide pegs 24 which are adapted to slide in bores in the lower surface of the upper portion 11 when the portions are brought together.

Extending downwardly from the upper portion 11 is a finger 25 which is vertically elongated and is bolted at its upper end to the upper portion 11. It extends downwardly across the end surface of the lower portion 12 to a position adjacent the ejector plate 17. A toggle 26 is attached at one end to the lower portion 12 and at the other end to the ejector plate 17; a similar toggle 27 is fastened in the same way between the upper portion 12 and the ejector plate 17. These toggles are located on either side of the centerline of the finger 25 in a manner which will be described more fully hereinafter.

Figure 2:
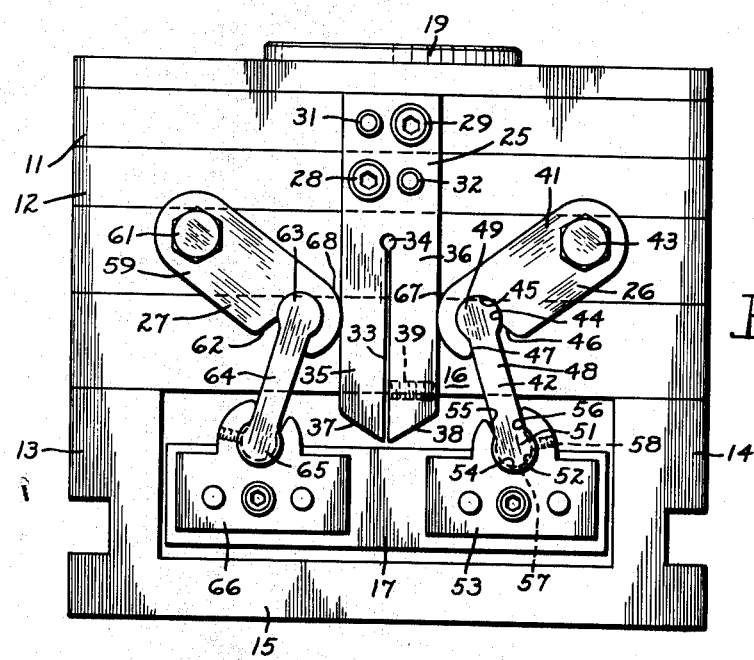
FIG. 2 is an end elevational view of the die.

In FIG. 2 it can be seen that the finger 25 is held on the upper portion 11 by two socket head bolts 28 and 29 and two cylindrical pins 31 and 32. At the other end the finger is provided with a narrow slot 33 which extends upwardly well above the center point along the centerline of the finger and terminates in a bore 34. The slot divides the finger into two halves 35 and 36 provided, respectively, with lower edges 37 and 38 which are inclined inwardly and downwardly toward the slot 33 to give the finger a pointed lower end. A set screw 39 is threaded through the half 36 adjacent the lower end and extends into the slot 33 and bears against the edge of the slot 33 formed on the opposite half 35.

The toggle 26 consists of an upper link 41 and a lower link 42. The upper link 41 is elongated and at one end is fastened to the upper portion 12 by means of a bolt 43 which, in the well known manner, is provided with a sleeve to provide free pivotal action between the upper link 41 and the upper portion 12 of the die. At the other end the upper link 41 is provided with a socket 44 having a substantial circular edge 45 from one end of which extends a straight portion 46 and which at the other end terminates in a straight portion 47. The lower link 42 consists of a straight rectangular center portion 48 terminating at the upper end in a circular head 49 which exactly fits the circular edge 45 of the upper lever. At the lower end the lower link 42 is provided with a circular head 51 which fits into a socket 52 formed in a socket member 53. The socket member is suitably bolted to the end of the ejector plate 17. The socket 52 consists of a circular portion 54 which terminates at one end in a straight portion 55 and at the other end in a straight portion 56. The circular head 51 of the lower link 42 is provided with a peripheral groove 57 in which resides the pointed end of a set screw 58 which extends through the side of the socket member 53. In a similar manner, the toggle 27 consists of an upper link 59 which is bolted at one end to the upper portion 12 by means of a pivot bolt 61 and at the other end is provided with a socket 62 in which is locked a circular head 63 at the upper end of a lower link 64. The lower link is provided at its lower end with a head 65 which is embraced by and held in a socket member 66 fastened to the end of the ejector plate 17. The toggles are such that the sum of the effective lengths of the links is greater than the distance between the points of attachment to the ejector plate 17 and the upper portion 12, so that they are both always in a "broken" condition with the center of the toggle, i.e., the pivot between the upper and lower links, directed inwardly toward the finger 25 and on either side of it. The lower end of the upper link 41 is provided with a circular edge 67 concentric with the circular edge 45, while the lower end of the upper link 59 is similarly provided with a circular edge 68 concentric with the circular edge of the socket 62, these two circular edges 67 and 68 embracing opposite straight edges of the finger 25.

Figure 3:
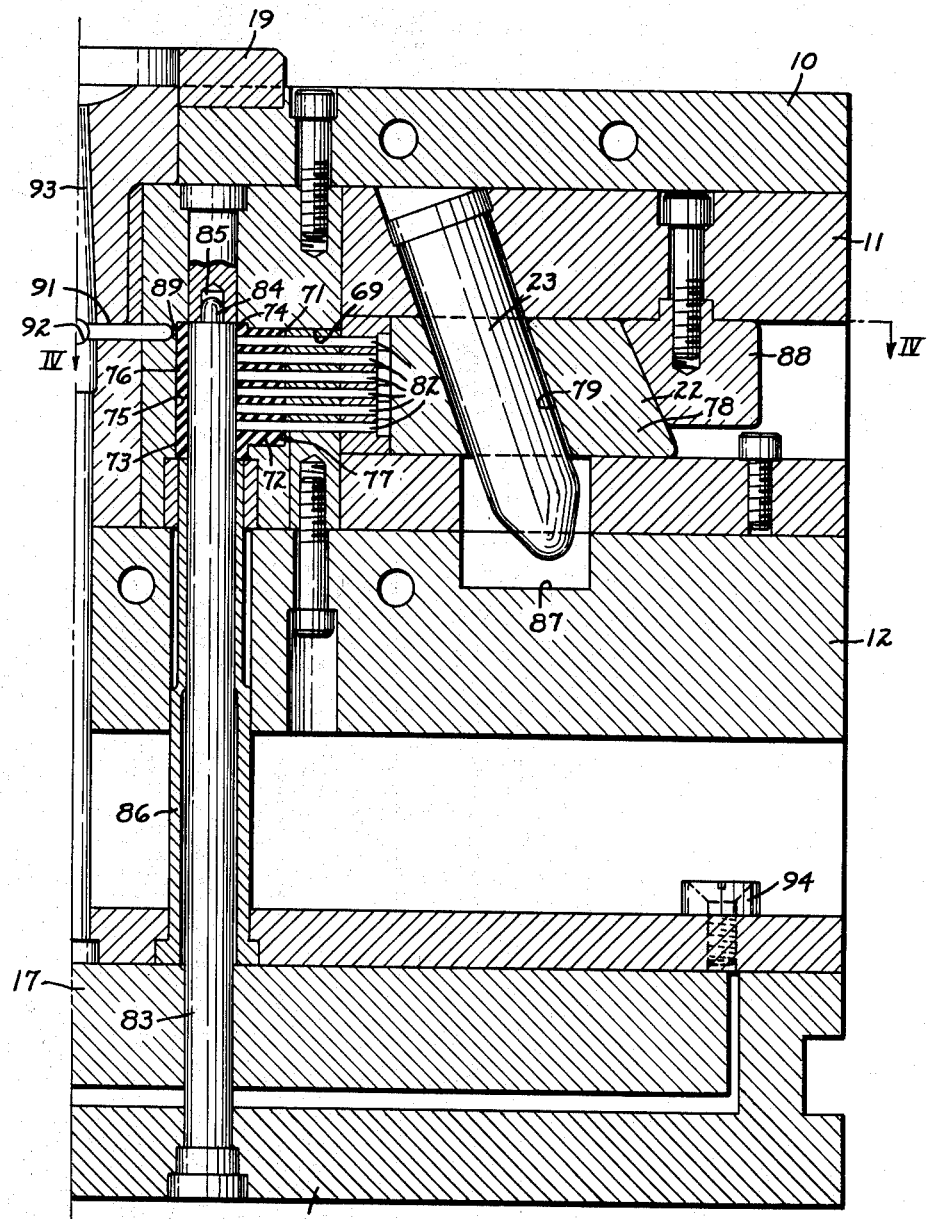
FIG. 3 is a sectional view of the die taken on the line III—III of FIG. 4.

Referring to FIGS. 3 and 4, which show some of the details of the die, it can be seen that the upper portion 11 is provided with a lower parting surface 69, while the lower portion 12 is provided with an upwardly-facing parting surface 71. These surfaces are pressed together when the die is closed, as is shown in FIG. 3. A plastic article 73 is shown in place within the mold cavity 72. Entering the upper portion 11 and opening on the parting surface 69 is a part 74 of the molding cavity 72, while a similar part 75 extends into the lower portion 12 and opens on the parting surface 71. For the purposes of description, the article 73 to be molded is shown as consisting of a tubular vertical portion 76 from which extends a flange 77 in which a vertical row of horizontal bores is to be formed, these bores going entirely through the flange into the bore of the tubular portion 76. If a mold cavity were formed with fixed metal fingers to form the bores in the flange 77, it would be impossible to withdraw the article (laterally of the fingers) from the cavity. For that purpose, the side-action mechanism 22 is used; it is provided with a block 78 slidable in the lower portion 12 and has an inclined bore 79 adapted to receive the lower end of the slanted peg. 23. At its inner side the block 78 is provided with a plurality of core members or horizontal pins 82 adapted to form the bores through the flange 77 of the molded article 73. Extending upwardly from the base 15 is a vertical post 83 which is adapted to reside in the mold cavity 72 and to define the bores for the tubular portion 76 of the molded article. At its upper end the shaft 83 is provided with a reduced dowel portion 84 adapted to fit in a downwardly-directed vertical socket 85 formed in the upper portion 11 of the die. Surrounding this shaft, slidable upon it, and fastened at its lower end to the ejector plate 17 is a tubular ejector pin 86 which is approximately the same cross-sectional size as the tubular portion 76 of the molded article and is coxial therewith. The nature of this ejector pin would, of course, vary with the type of article being molded, as would the horizontal pins 82 forming the core members. It is interesting to note that underlying the inclined bore 79 in the block 78 is a recess 87 to receive the peg 23 on occasion; the recess is formed in the upper part of the portion of the lower portion 12 on which the block rests and is slidably mounted. In addition to the slanted peg 23, the upper portion 11 is provided with an inclined block 88 bolted to the lower surface of the upper portion 11 and having an inclined surface which engages a corresponding inclined surface on the block 78 of the side-action mechanism 22. Leading from the upper part of the mold cavity 72 is a small passage 89 leading to a somewhat larger branch passage 91 which leads to a main passage 92 which is connected to the lower end of an entrance ejection passage 93 extending vertically from the injection port 19. Mounted on the upper surface of the ejector plate 17 is a stop block 94 intended to engage the lower surface of the lower portion 12 of the die to limit upward motion of the ejector pin 86.

As is evident in FIG. 4, the main passage 92 is provided with a large number of branch passages similar to the branch passage 91, each branch passage leading to a mold cavity similar to the mold cavity 72. These mold cavities are arranged on either side of the centerline defined by the main passage 92, those on one side being serviced by the side-action mechanism 22, while a similar side-action mechanism 95 is provided for the row on the other side. It should be noted that the lower portion 12 of the die is provided with a system 96 of water cooling passages having entrance ports 97 and outlet ports 98. The other end of the die is provided with a finger similar to the finger 25 and toggles similar to the toggles 26 and 27 described above.

The operation of the invention will now be readily understood in view of the above description. The upper portion 11 is moved toward the lower portion 12 by the injection molding machine apparatus and slides vertically on the posts 18. When the two portions are pressed together with the parting surfaces 69 and 71 pressed together the mold cavity 72 is completely formed. Molten plastic is injected into the injection port 19 and flows down the entrance passage 93, through the main passage 92, and into each of the branch passages 92 to the mold cavity 72, passing, in the meanwhile, through the small passage 89. Water passing through the system 96 cools the molds and causes hardening of the plastic. After the plastic is hardened, the upper portion is lifted and the ejection plate 17 is moved upwardly. This carries the ejector pin 86 upwardly and it pushes the molded part upwardly above the parting surface 71 of the lower portion 12. The operator removes the molded article or an automatic apparatus pushes it from the mold, so that the machine is ready for the next cycle. Now, as the upper portion 11 moves downwardly, the slanted peg 23 engages the bore 79 and moves the block 78 to the left (in FIG. 3), so that the pins 82 move to the left. During the injection part of the cycle, these pins act as core members to form the passages through the flange 72 of the article. When the article has been molded, the upper portion 11 is moved upwardly again and this motion causes the peg 23 to cam the block 78 and the core members to the right and away from the mold cavity. Now, as is evident in FIG. 3, if the ejector pin 86 moves vertically before the pins 82 are removed, they will shear the pins and damage the die; conversely, if the pins 82 are moved to the left, as the upper portion 11 moves vertically downwardly, and the ejector pin 86 still resides in the mold cavity, the machine will be damaged. For that reason, therefore, when the upper portion 11 moves downwardly, the finger 25 at a proper part of the movement engages the curved portions 67 and 68 of the toggles 26 and 27, respectively. The slanted edges 37 and 38 press the centers of the toggles sideways and this causes the toggles to straighten out in the vertical direction with considerable force and by vertical amounts substantially greater than the sideways movement due to the finger. This causes a rapid movement of the ejector plate 17 downwardly with considerable force, so that, if there is any sticking of the parts, this will be overcome by the violent action of the finger 25 and the toggles 26 and 27. The action of these elements can be adjusted by varying the distance between the sides of the finger by use of the set screw 39. It is, therefore, impossible for the ejector plate 17 to remain in its upper position when the upper portion 11 moves downwardly and the core members move into the mold cavity.

It can be seen, then, that this invention assures that the ejector plate 17 with its ejector pin 86 is well removed from the mold cavity area and in its downward position before the core members are moved into the mold cavity. The problem (which was inherent in spring-actuated ejector plates) of the spring breaking no longer exists. Furthermore, the force is adaptable in the sense that, if any resistance to movement of the ejector plate is encountered, the force builds up until it is large enough to overcome the resistance. The apparatus is simple and there are none of the difficulties inherent in hydraulically-actuated means for performing this function.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A die for use in the injection molding of a plastic article, comprising
   (a) an upper portion containing a first part of a mold cavity opening on a parting surface,
   (b) a lower portion containing a second part of the mold cavity opening on a parting surface,
   (c) guide means for moving the upper portion toward the lower portion to bring the parting surfaces together to complete the mold cavity,
   (d) an ejector plate associated with one of the portions located under the second portion and having a pin movable in a first direction into the mold cavity when the portions are separated to eject a molded article,
   (e) a side-motion mechanism associated with one of the portions movable parallel to the parting surfaces when the portions move toward one another to introduce a core member transversely of the first direction into the mold cavity when the portions are together to form part of the molded article,
   (f) an elongated finger fastened at one end to the upper portion and extending across the lower portion with the other end adjacent the ejector plate, and
   (g) a toggle fastened at one end to the lower portion and at the other end to the ejector plate, the said other end of the finger engaging the center of the toggle during the movement of the upper portion to move the ejector plate away from the second portion and withdraw the ejector pin from the mold cavity before the core member is introduced therein.

2. A die as recited in claim 1, wherein the toggle consists of two toggle portions facing toward one another and the elongated finger is provided with a pointed cam portion which is directed between the two toggle portions to force them both into straightened position to move the ejector plate.

References Cited by the Examiner

UNITED STATES PATENTS

| | | | |
|---|---|---|---|
| 2,470,402 | 5/1949 | Jobst | 18—30 |
| 2,483,093 | 9/1949 | Harvey | 18—42 |
| 2,485,336 | 10/1949 | Valyi | 18—42 XR |
| 2,718,032 | 9/1955 | Harvey | 18—42 |
| 2,783,501 | 3/1957 | Kutik | 18—30 XR |
| 2,783,502 | 3/1957 | Abplanalp | 18—42 |
| 2,994,921 | 8/1961 | Hultgren | 18—42 |
| 3,049,759 | 8/1962 | Eberhardt | 18—42 |
| 3,060,509 | 10/1962 | McCubbins | 18—42 |
| 3,074,113 | 1/1963 | Specht | 18—42 |

J. SPENCER OVERHOLSER, *Primary Examiner.*

MICHAEL V. BRINDISI, *Examiner.*